United States Patent
Moon et al.

(10) Patent No.: US 11,752,905 B2
(45) Date of Patent: Sep. 12, 2023

(54) DEVICE FOR PROVIDING FATIGUE-REDUCING POSITION OF VEHICLE SEAT

(71) Applicants: Hyundai Motor Company, Seoul (KR); Kia Corporation, Seoul (KR)

(72) Inventors: Hyun Kyu Moon, Gyeonggi-do (KR); Sang Do Park, Gyeonggi-Do (KR); Sang Uk Yu, Seoul (KR); Deok Soo Lim, Gyeonggi-Do (KR); Hyo Cheol Kang, Gyeonggi-do (KR); Ju Yeol Kong, Gyeonggi-do (KR); Hyung Jin Park, Seoul (KR); Seon Chae Na, Gyeonggi-do (KR); Chan Ho Jung, Gyeonggi-do (KR); Seong Mun Yun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 79 days.

(21) Appl. No.: 17/570,686

(22) Filed: Jan. 7, 2022

(65) Prior Publication Data

US 2022/0219582 A1 Jul. 14, 2022

(30) Foreign Application Priority Data

Jan. 14, 2021 (KR) .......................... 10-2021-0005015

(51) Int. Cl.
*B60N 2/34* (2006.01)
*B60N 2/01* (2006.01)

(52) U.S. Cl.
CPC ........ *B60N 2/34* (2013.01); *B60N 2/01* (2013.01)

(58) Field of Classification Search
CPC . B60N 2/34; B60N 2/01; B60N 2/012; B60N 2/015; B60N 2/12; B60N 2/32;
(Continued)

(56) References Cited

U.S. PATENT DOCUMENTS

| 5,975,612 A * | 11/1999 | Macey ................. B60N 2/3093 296/65.13 |
| 7,240,949 B1 * | 7/2007 | Moushegian ........ B60N 2/3022 296/65.01 |

(Continued)

FOREIGN PATENT DOCUMENTS

| JP | 2592351 B2 | 3/1997 |
| JP | 6254873 B2 | 12/2017 |

(Continued)

*Primary Examiner* — Mark R Wendell
(74) *Attorney, Agent, or Firm* — Fox Rothschild LLP

(57) ABSTRACT

A device for providing a fatigue-reducing position of a vehicle seat is provided. A first latch unit is mounted on a rear seat cushion such that a first striker mounted on a front seatback is fastened thereto in a lockable manner. A second latch unit is mounted on a rear surface portion of a rear seatback. A sliding-locking unit is mounted on a package panel disposed behind a rear seat in a height adjustable manner. A second striker is provided on a front end of the sliding-locking unit to be fastened to the second latch unit in a lockable manner. A seat in a second or third row in the cabin of a vehicle is detachable from the original position to be fixedly placed like a hammock between a front seat and a package panel to provide a fatigue-reducing position in which an occupant comfortably rests.

14 Claims, 12 Drawing Sheets

(58) Field of Classification Search
CPC .......... B60N 2/10; B60N 2/1605; B60N 2/18;
B60N 2/22; B60N 2/24; B60N 2/3097
USPC .................................................. 297/378.12
See application file for complete search history.

(56) References Cited

U.S. PATENT DOCUMENTS

| | | | | |
|---|---|---|---|---|
| 2004/0104590 A1* | 6/2004 | Kikuchi | ............... | B60N 2/3011 |
| | | | | 296/65.03 |
| 2008/0111391 A1* | 5/2008 | Imamura | .................. | B60N 2/20 |
| | | | | 296/65.01 |
| 2008/0143159 A1* | 6/2008 | Song | .................... | B60N 2/3065 |
| | | | | 297/317 |
| 2019/0263306 A1 | 8/2019 | Welch et al. | | |

FOREIGN PATENT DOCUMENTS

| KR | 20-0324008 Y1 | 8/2003 |
|---|---|---|
| KR | 10-2006-0091880 A | 8/2006 |

\* cited by examiner

DEVICE FOR PROVIDING FATIGUE-REDUCING POSITION OF VEHICLE SEAT

CROSS REFERENCE TO RELATED APPLICATION

The present application claims priority to Korean Patent Application No. 10-2021-0005015, filed Jan. 14, 2021, the entire contents of which is incorporated herein for all purposes by this reference.

BACKGROUND

Field of the Disclosure

The present disclosure relates generally to a device for providing a fatigue-reducing position of a vehicle seat. More particularly, the present disclosure relates to a device for providing a fatigue-reducing position of a vehicle seat, the device enabling a seat in a second or third row to be fixedly placed like a hammock in the cabin of the vehicle to provide a fatigue-reducing position in which an occupant may comfortably rest.

Description of the Related Art

Generally, a vehicle seat is provided with basic components, such as a seat cushion on which the lower part of the body of an occupant is seated, a seatback against which the upper part of the body of the occupant is leaned, and a headrest supporting the neck and the head of the occupant, as well as a variety of seat adjustment devices and a variety of convenience devices disposed inside and outside the seat. In addition, a seat mechanism enabling the position of the seat to be freely changed according to the body shape of the occupant or the situation is further required.

The vehicle seat is basically provided with a reclining device for reclining the seatback backward to allow an occupant to rest or sleep thereon. However, there is a drawback in that it is impossible to uniformly distribute the pressure of the body of the occupant only using the reclining device. Thus, there is a drawback in that a fatigue-reducing position may not be established. For reference, the fatigue-reducing position refers to a position in which the angles of support of the buttocks, the thighs, calves, and the like may be changed when the angle of support of the upper body of an occupant is changed to distribute the pressure of the body of the occupant to the maximum extent, so that the occupant may feel comfortable while the fatigue of the occupant is reduced.

Accordingly, for autonomous driving vehicles to be released in the future, a solution enabling an occupant to be in a fatigue-reducing position in the cabin of a vehicle during long distance traveling is required. In addition, the provision of a seat mechanism able to provide a comfortable relaxation position is required to allow a user to rest or sleep in the cabin of a vehicle for vehicle camping or the like.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a device for providing a fatigue-reducing position of a vehicle seat. The device enables a seat in a second or third row in the cabin of a vehicle to be detached from the originally-mounted position and be fixedly placed like a hammock between a front seat and a package panel to provide a fatigue-reducing position in which an occupant may comfortably rest.

In order to achieve the above objective, according to one aspect of the present disclosure, a device for providing a fatigue-reducing position of a vehicle seat is provided. The device may include: a first striker mounted on a front seatback; a first latch unit mounted on a rear seat cushion such that the first striker is fastened thereto in a lockable manner; a second latch unit mounted on a rear surface portion of a rear seatback; a sliding-locking unit mounted on a package panel disposed behind a rear seat in a height adjustable manner; and a second striker provided on a front end of the sliding-locking unit to be fastened to the second latch unit in a lockable manner.

The first latch unit may be mounted on a front end of the rear seat cushion or at a lower position on the front end of the rear seat cushion to fasten the first striker in a lockable manner. The second latch unit may be mounted on a top end side of the rear surface portion of the rear seatback. The first striker may be mounted at a position on an upper surface of the front seatback exposed when the headrest is detached from the front seatback or at a top end position on a rear surface of the front seatback.

The first striker of the front seatback may be fastened to the first latch unit of the rear seat cushion and the second striker of the sliding-locking unit mounted on the package panel is fastened to the second latch unit of the rear seatback, to place and fix a rear seat between the front seatback and the package panel. The first striker may have a shape of a quadrangular loop and be mounted to a pivot bracket by welding or the like. The pivot bracket may be hinged or fastened to a fixing bracket fixedly mounted on a top end of a rear surface portion of the front seatback to be pivotable in a top-bottom direction.

The first latch unit may include: a control lever mounted on a front end of the rear seat cushion to pivot when manipulated by being pulled; a protrusion that protrudes from an inner surface portion of the control lever to pivot along with the control lever when the control lever is pivoted; a pair of first support brackets mounted at inner positions on the front end of the rear seat cushion; a first locking lever including a first pulling end integrally provided on an upper portion thereof and a locking end integrally provided on a rear portion thereof, the first locking lever being axially disposed on the pair of first support brackets via a first rotary shaft; a push bar connected to the first pulling end of the first locking lever; a second locking lever including a catching end integrally provided on an upper portion thereof, the catching end being configured to be restrained by the locking end of the first locking lever, and a first locking recess provided on a lower portion thereof, the first locking recess being configured to receive the first striker inserted thereinto, wherein the second locking lever is axially disposed on the pair of first support brackets via a second rotary shaft; a vertical bent bar connected to the protrusion and the push bar, wherein the vertical bent bar is rotated and pushes the push bar forward when the control lever and the protrusion rotate; and a first return spring connected to the first rotary shaft and the second rotary shaft.

A support plate supporting the vertical bent bar may be provided at a side position behind the control lever. The support plate may have a slot by which an angle of rotation and a distance of the vertical bent bar are defined.

The second latch unit may include: a pair of second support brackets mounted on a top end of a rear surface of the rear seatback; a third locking lever including a cable connecting end provided on a top portion thereof, connected to a pulling cable, and configured to be pulled, and a stopper end provided on a lower portion thereon, wherein the third locking lever is axially mounted on the pair of second support brackets via a third rotary shaft; a fourth locking lever including a second pulling end integrally provided on an upper portion thereof and a second locking recess provided on a lower portion thereof and receiving the second striker inserted thereinto, wherein the fourth locking lever is axially mounted on the pair of second support brackets via a fourth rotary shaft; and a second return spring connected to the third locking lever and the second pulling end of the fourth locking lever.

The sliding-locking unit may include: a rail pipe mounted on the package panel to be arranged in a top-bottom direction; a slider fitted around an outer surface of the rail pipe to be movable vertically; an elastic clamp having a circular tubular structure with one side thereof being open, the elastic clamp being located between an outer surface of the rail pipe and an inner surface of the slider; a pulling plate integrally provided on one end of the elastic clamp and that extends toward an outer diameter portion of the slider; a stopper integrally provided on an outer surface of the slider to define positions of the pulling plate before and after being pulled; and a manipulation cable connected to the pulling plate and configured to be pulled.

A friction plate may be provided on an inner surface of the elastic clamp to be in contact with or detached from the rail pipe. When the manipulation cable is manipulated by being pulled, the elastic clamp may be expanded in an outer diameter direction while being pulled, thus realizing an unlocking operation for releasing the elastic clamp to neither press nor be in friction contact with the rail pipe.

When a manipulation of pulling the manipulation cable is stopped, the pulling plate may be moved to an original position while the elastic clamp is contracted in an inner diameter direction by elastic restorative force, so that a locking operation in which the elastic clamp is pressed against and in friction contact with the rail pipe is performed. A placing plate protruding forward may be mounted on the slider, and the second striker may be provided on a front end of the placing plate.

According to exemplary embodiments of the present disclosure, the following effects may be provided.

First, a seat in a second or third row may be detached from the originally-mounted position and be fixedly placed like a hammock in the cabin of a vehicle to provide a fatigue-reducing position in which an occupant may comfortably rest.

Second, a seat in a second or third row may be detached from the originally-mounted position and be fixedly placed like a hammock in the cabin of a vehicle so that the angle of the seat cushion of the detached rear seat and the reclining angle of the seatback of the detached rear seat may be adjusted by moving the sliding-locking unit up and down. Accordingly, a variety of fatigue-reducing positions may be provided as intended by the occupant.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

Figure 1:
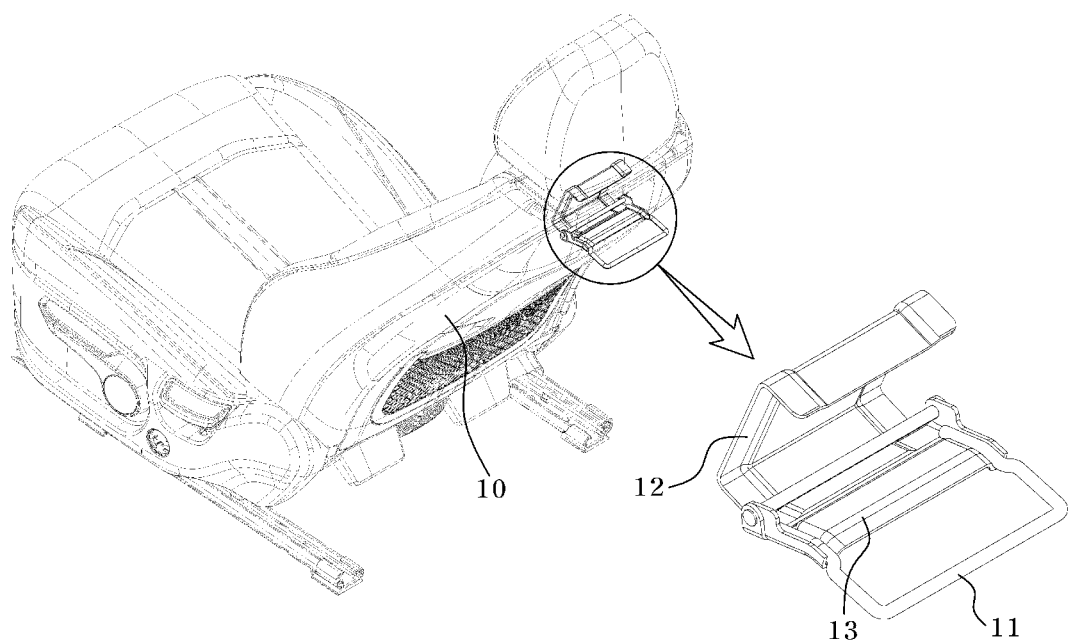
FIG. 1 is a perspective view illustrating a first striker of a device for providing a fatigue-reducing position according to the present disclosure, the first striker being mounted on a front seatback.
Figure 2:
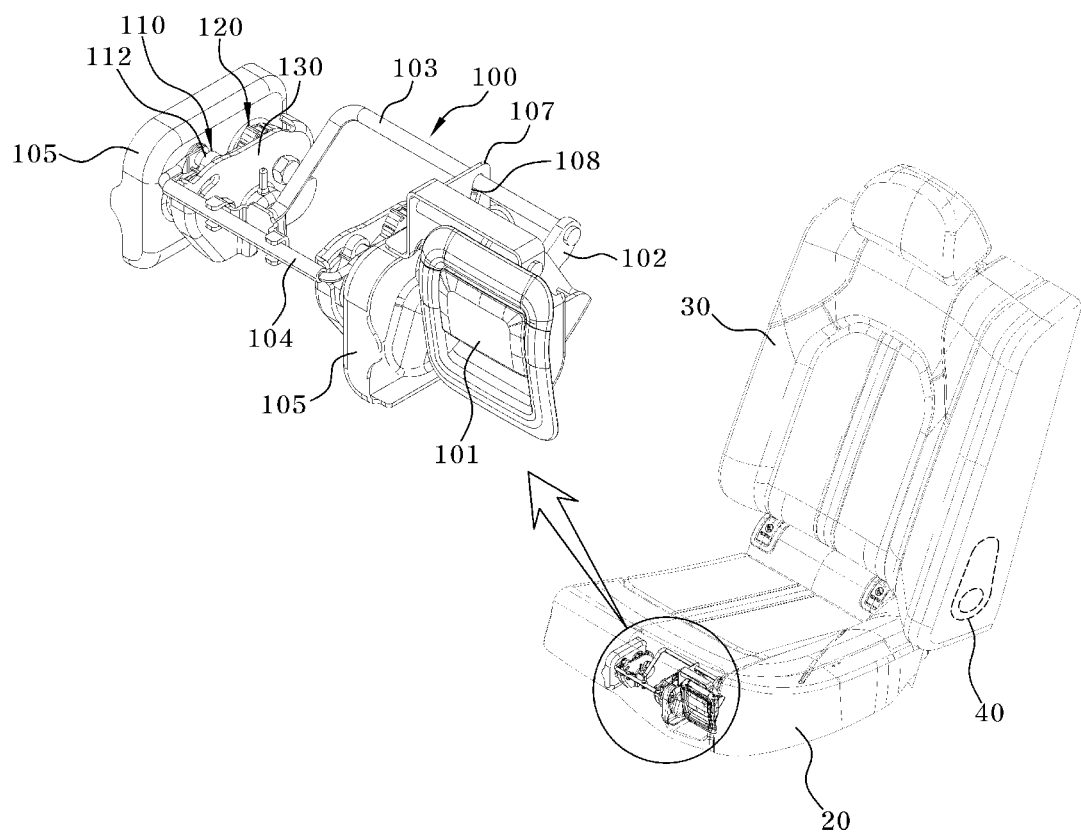
FIG. 2 is a perspective view illustrating a first latch unit of the device for providing a fatigue-reducing position according to the present disclosure, the first latch unit being mounted on a rear seat cushion.
Figure 3:
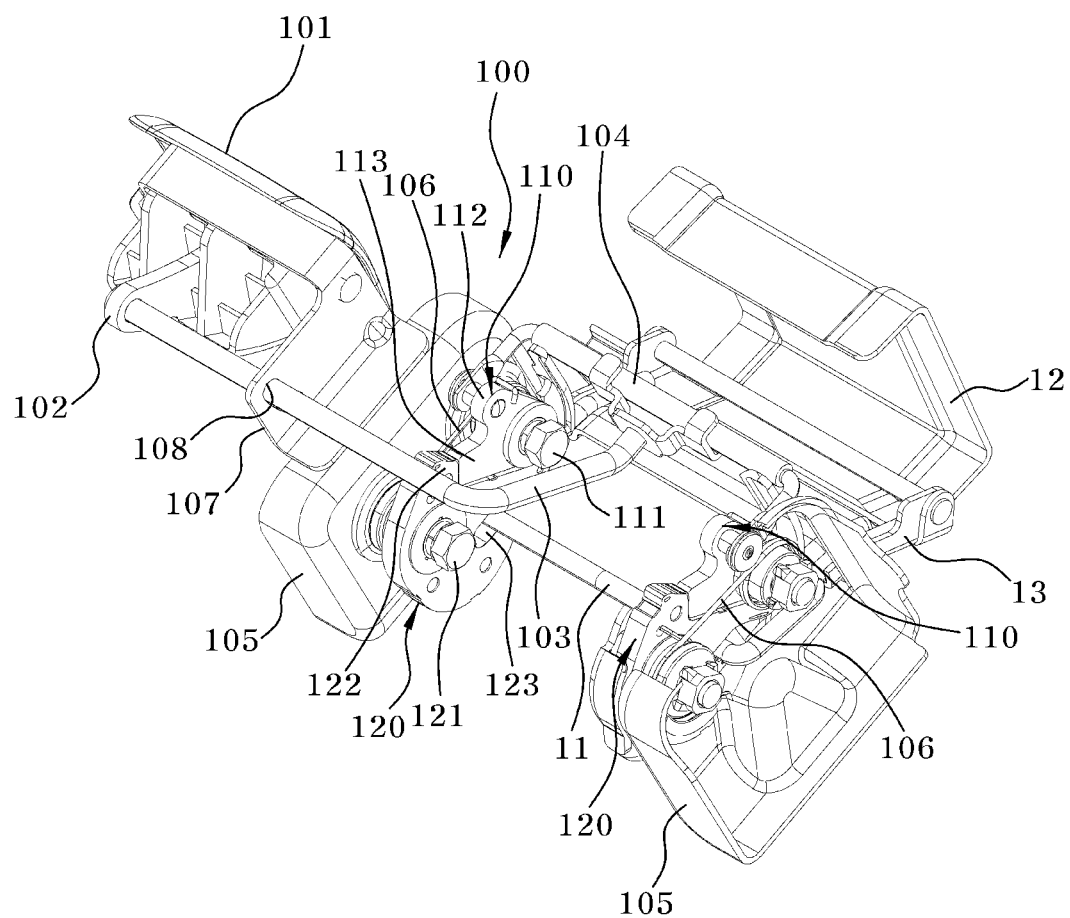
FIG. 3 is an enlarged perspective view illustrating portions of the device for providing a fatigue-reducing position according to the present disclosure, in which the first latch unit and the first striker are fastened to each other.

In the accompanying drawings, FIG. 1 is a perspective view illustrating a first striker 11 of a device for providing a fatigue-reducing position according to the present disclosure, the first striker 11 being mounted on a front seatback 10, FIG. 2 is a perspective view illustrating a first latch unit 100 of the device for providing a fatigue-reducing position according to the present disclosure, the first latch unit 100 being mounted on a rear seat cushion 20, and FIG. 3 is an enlarged perspective view illustrating portions of the device for providing a fatigue-reducing position according to the present disclosure, in which the first latch unit 100 and the first striker 11 are fastened to each other. In FIG. 3, a protective cover 130 illustrated in FIG. 2 is omitted.

As illustrated in FIG. 1, the first striker 11 may be mounted at a position on the upper surface of the front seatback 10 exposed when the headrest is detached from the front seatback 10 or the top end of the rear surface of the front seatback 10. Particularly, a fixing bracket 12 is fixedly mounted on the top end of the rear surface of the front seatback 10. A pivot bracket 13 may be hinged or fastened to the fixing bracket 12 to be pivotable in the top-bottom direction. The first striker 11 has the shape of a quadrangular loop and is mounted to the pivot bracket 13 by welding or the like. Thus, when the first striker 11 is turned while being pushed forward, the first striker 11 may be moved to a non-use position (i.e. a parking position) in which both the first striker 11 and the pivot bracket 13 are brought into close contact with a rear surface portion of the fixing bracket 12. In contrast, when the first striker 11 is turned while being pulled backward, the first striker 11 is deployed to a use position to be fastened to the first latch unit 100.

As illustrated in FIGS. 2 and 3, the first latch unit 100 allowing the first striker 11 mounted on a rear surface portion of the front seatback 10 to be fastened in a lockable manner may be mounted on the front end of the rear seat cushion 20. Particularly, the first latch unit 100 may be mounted at a lower position on the front end of the rear seat cushion to fasten the first striker 11 in a lockable manner.

As one component of the first latch unit 100, a control lever 101 to be manipulated by a user may be pivotably mounted at a predetermined position on the front end of the rear seat cushion 20. In addition, a protrusion 102 is integrally provided on the inner surface of the control lever 101 such that the protrusion 102 pivots along with the control lever 101 when the control lever 101 is pivoted.

A pair of first support brackets 105 may be mounted at inner positions on the front end of the rear seat cushion 20 such that the first support brackets 105 are spaced apart from each other in the transverse direction. A first locking lever 110 may be rotatably mounted at a front position on the inner surface of each of the first support brackets 105, and a second locking lever 120 may be rotatably mounted at a rear position on the inner surface of each of the first support brackets 105.

The first locking lever 110 is configured such that a first pulling end 112 is integrally formed and a locking end 113 is integrally formed on the rear portion. The first locking lever 110 may be rotatably mounted at a front position on the inner surface of each of the first support brackets 105 via a first rotary shaft 111. The second locking lever 120 is configured such that a catching end 122 configured to be restrained by the locking end 113 is integrally formed on the upper portion thereof and a first locking recess 123 configured to receive the first striker 11 inserted thereinto is formed in the lower portion of the second locking lever 120. Thus, the second locking lever 120 may be rotatably mounted at a rear position on the inner surface of the first support brackets 105 via a second rotary shaft 121.

Figure 4A:
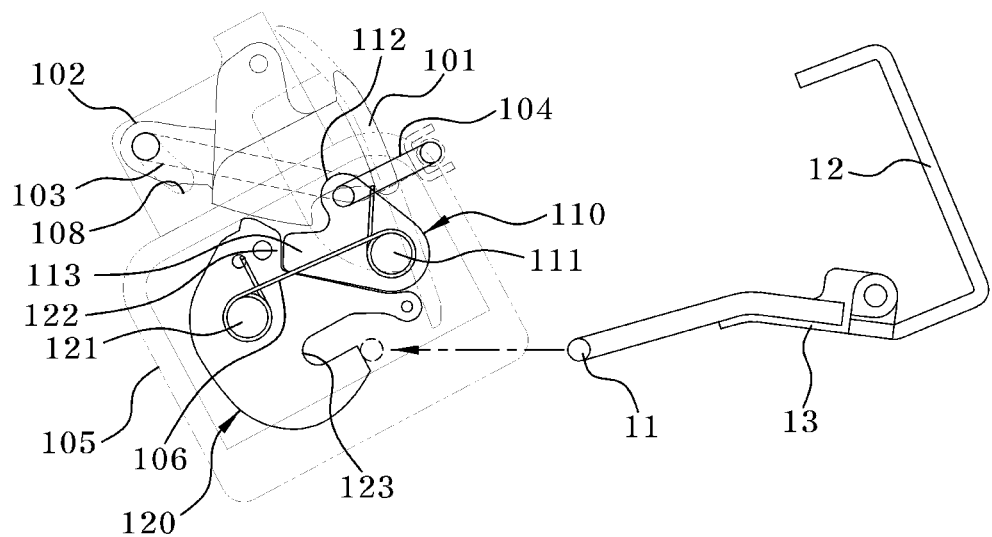
FIGS. 4A to 4C are side views illustrating a process of fastening the first latch unit and the first striker among the components of the device for providing a fatigue-reducing position according to the present disclosure.
Figure 4B:
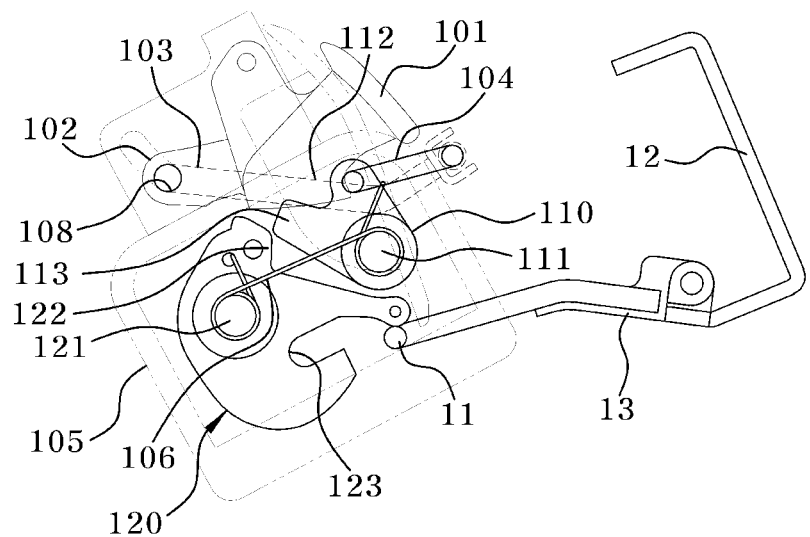
Figure 4C:
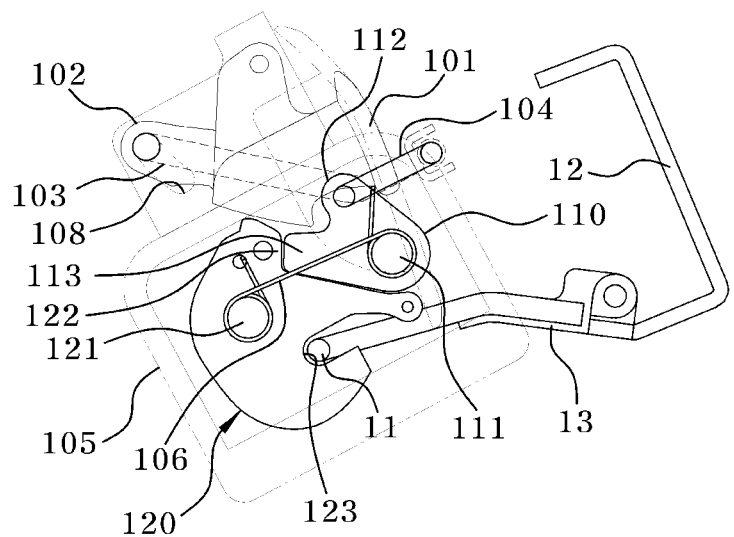

In particular, a push bar 104 may be connected to the first pulling end 112 of the first locking lever 110. In addition, a vertical bent bar 103 is connected to the protrusion 102 and the push bar 104. When the control lever 101 and the protrusion 102 rotate, the vertical bent bar 103 is also rotated and pushes the push bar 104 forward. In addition, as illustrated in FIGS. 4A to 4C, a first return spring 106 is connected to the first rotary shaft 111 and the second rotary shaft 121. The first return spring 106 provides elastic restorative force to the first locking lever 110 and the second locking lever 120 so that the first locking lever 110 and the second locking lever 120 rotate and return to the original positions.

Particularly, a support plate 107 that supports the vertical bent bar 103 may be formed at a side position behind the control lever 101. The support plate 107 may include a slot 108 by which the angle of rotation and the distance of the vertical bent bar 103 are defined. Thus, as illustrated in FIG. 4A, when the control lever 101 is not manipulated, the first locking recess of the second locking lever 120 is arranged in an upwardly-inclined position such that the first striker 11 may not be smoothly inserted into the first locking recess 123.

In contrast, when the control lever 101 is pushed upward by the user, as illustrated in FIG. 4B, the protrusion 102 and the vertical bent bar 103 rotate downward and, at the same time, the vertical bent bar 103 pushes the push bar 104 forward. Subsequently, the push bar 104 pulls the first pulling end 112 of the first locking lever 110 in the forward direction and, at the same time, the first locking lever 110 rotates in the forward direction about the first rotary shaft 111. Consequently, the catching end 122 of the second locking lever 120 is unlocked from the locking end 113 of the first locking lever 110.

At the same time, the second locking lever 120 may be rotated downward about the second rotary shaft 121 by elastic restorative force of the first return spring 106. Consequently, the first locking recess of the second locking lever 120 may be arranged in a forwardly-open position such that the first striker 11 is inserted thereinto. Then, as illustrated in FIG. 4B, the first striker 11 mounted on the front seatback may be inserted more easily into the first locking recess of the second locking lever 120.

As illustrated in FIG. 4C, after the first striker 11 is inserted into the first locking recess of the second locking lever 120, when the user releases the control lever 101, the first locking recess of the second locking lever 120 is arranged in an upwardly-inclined position. Consequently, the first striker 11 may be in a locked position in which the first striker 11 is not separated from the first locking recess.

Figure 5:
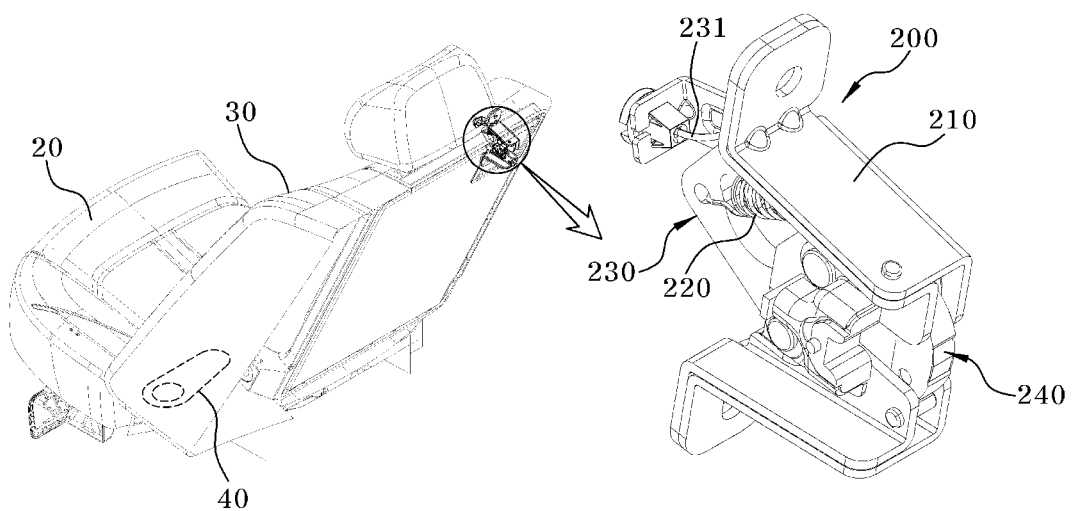
FIG. 5 is a view illustrating a second latch unit among the components of the device for providing a fatigue-reducing position according to the present disclosure, the second latch unit being disposed on a rear seatback.
Figure 6:
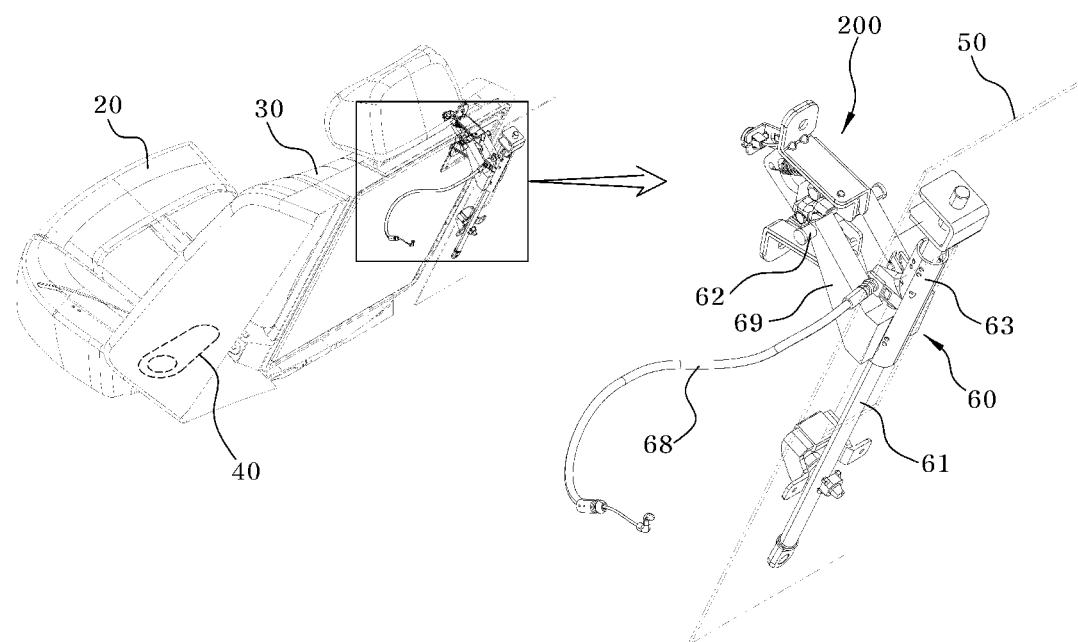
FIG. 6 is a perspective view illustrating a sliding-locking unit having a second striker among the components of the device for providing a fatigue-reducing position according to the present disclosure, the sliding-locking unit being mounted on a package panel behind the rear seat.
Figure 7:
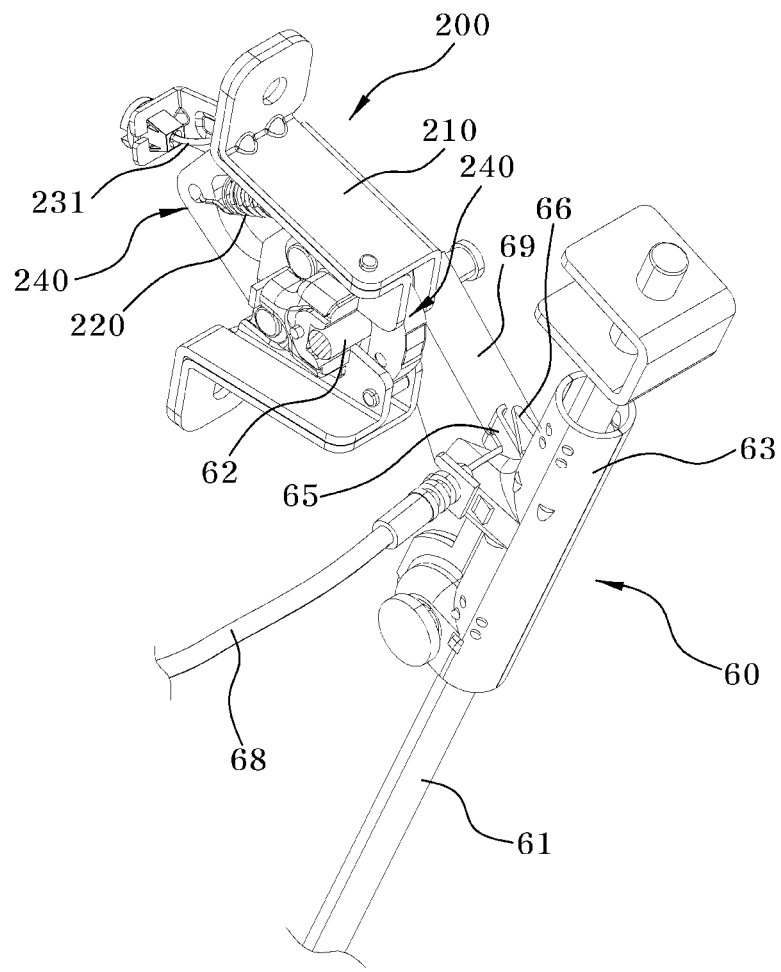
FIG. 7 is an enlarged perspective views illustrating the fastening of the second latch unit and the second striker among the components of the device for providing a fatigue-reducing position according to the present disclosure.
Figure 8A:
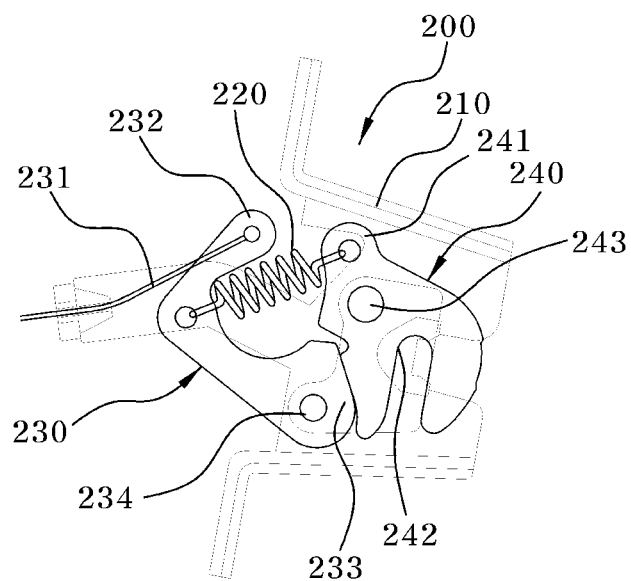
FIGS. 8A to 8C are side views illustrating a fastening process of the second latch unit and the second striker among the components of the device for providing a fatigue-reducing position according to the present disclosure.
Figure 8B:
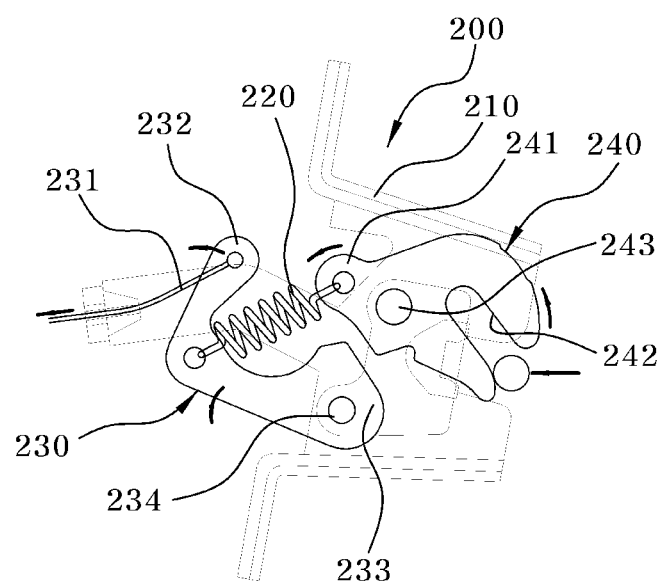
Figure 8C:
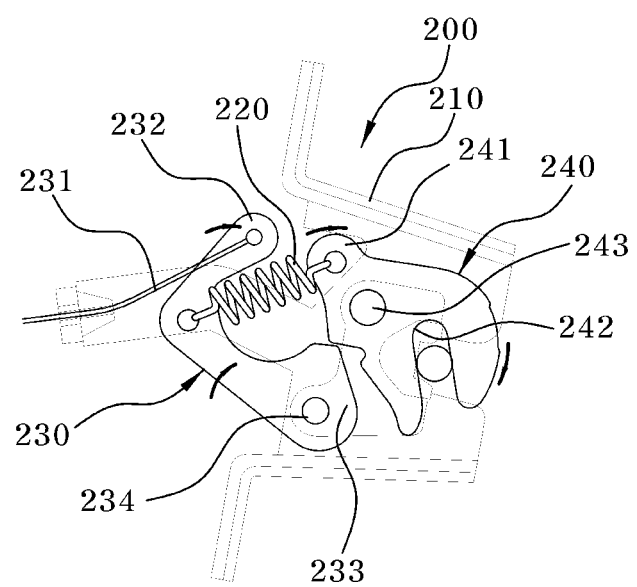

In the accompanying drawings, FIG. 5 is a view illustrating a second latch unit 200 among the components of the device for providing a fatigue-reducing position according to the present disclosure, the second latch unit 200 being disposed on a rear seatback 30, FIGS. 6 and 7 are views illustrating a sliding-locking unit having a second striker 62 among the components of the device for providing a fatigue-reducing position according to the present disclosure, the sliding-locking unit being mounted on a package panel 50 behind the rear seat, and FIGS. 8A to 8C are side views illustrating a fastening process of the second latch unit 200 and the second striker 62 among the components of the device for providing a fatigue-reducing position according to the present disclosure.

As illustrated in FIGS. 5 and 6, the second latch unit 200 may be mounted on the top end side of the rear surface portion of the rear seatback 30, and may fasten the top end of the rear surface of the rear seatback 30 to the package panel 50 disposed behind the rear seat. The second latch unit 200 may include second support brackets 210, a second return spring 220, a third locking lever 230, a fourth locking lever 240, and the like.

In particular, the second support brackets 210 may be mounted at inner positions on the top end of the rear surface of the rear seatback 30. The third locking lever 230 is configured such that a cable connecting end 232 connected to a pulling cable 231 is formed on the upper portion thereof such that the pulling cable 231 may be pulled and a stopper end 233 configured to stop the rotation of the fourth locking lever 240 in the forward direction is formed on the lower portion thereof. The lower end of the third locking lever 230 is rotatably mounted on the rear end side of the pair of second support brackets 210 via the third rotary shaft 234.

The fourth locking lever 240 is configured such that a first pulling end 241 may be integrally formed on the upper portion thereof and a second locking recess 242 configured to receive the second striker 62 inserted thereinto may be formed in the lower portion thereof. The fourth locking lever 240 may be rotatably mounted on the front end side of the pair of second support brackets 210 via a fourth rotary shaft 243. In particular, the second return spring 220 may be connected to a middle portion of the third locking lever 230 and the first pulling end 241 of the fourth locking lever 240.

Thus, as illustrated in FIG. 8A, the second locking recess 242 of the fourth locking lever 240 is usually arranged in a downwardly-open position, i.e. in a position in which the second striker 62 may not be inserted thereinto. In contrast, when a user-manipulatable lever (not shown) connected to the pulling cable 231 is pulled, the pulling cable 231 pulls the cable connecting end 232 of the third locking lever 230, and thus, the third locking lever 230 may rotate in the forward direction about the third rotary shaft 234.

At the same time, since the third locking lever 230 is connected to the first pulling end 241 of the fourth locking lever 240 via the second return spring 220, when the third locking lever 230 is rotated, the second return spring 220 may be pulled forward to pull the first pulling end 241 of the fourth locking lever 240 forward. Then, as illustrated in FIG. 8B, since the fourth locking lever 240 is rotated in the forward direction, the second locking recess 242 is arranged in a backwardly-open position, and thus, the second striker 62 may be inserted thereinto.

As illustrated in FIG. 8C, when the user releases a lever (not shown) connected to the pulling cable 231, the fourth locking lever 240 may be rotated to the original position by elastic restorative force of the second return spring 220 to arrange the second locking recess 242 in a downwardly-open position. Consequently, the second striker 62 may be locked into the second locking recess 242.

Referring to FIGS. 6 and 7, a package panel 50 may be mounted on the rear portion of the rear seat to divide the rear seat from a trunk room, and a sliding-locking unit 60 may be mounted on the package panel 50 in a height-adjustable manner. Particularly, the second striker 62 configured to be inserted into the second locking recess 242 of the fourth locking lever 240 in a lockable manner may be formed on the front end of the sliding-locking unit 60.

As a component of the sliding-locking unit 60, a rail pipe 61 arranged in the vertical direction may be mounted on a rear surface portion of the package panel 50. In addition, a slider 63 having the shape of a hollow pipe may be fitted around the outer surface of the rail pipe 61 to allow the hollow pipe to be movable vertically. In particular, the second striker 62 may be mounted on a placing plate 69 mounted on the slider 63 and may protrude forward while being arranged in the transverse direction of the placing plate 69.

Figure 11:
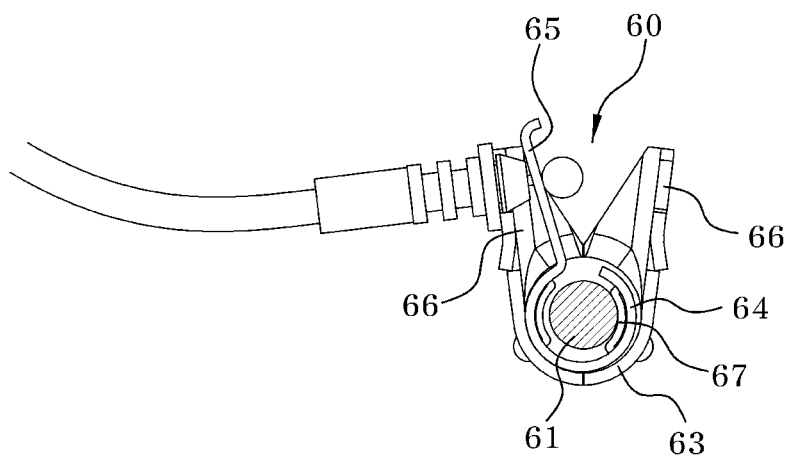
FIG. 11 is a cross-sectional view illustrating a locked position of the sliding-locking unit among the components of the device for providing a fatigue-reducing position according to the present disclosure.
Figure 12:
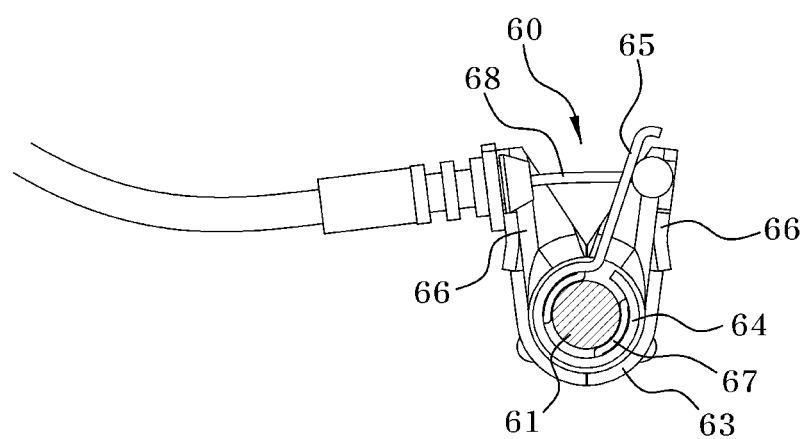
FIG. 12 is a cross-sectional view illustrating an unlocked position of the sliding-locking unit among the components of the device for providing a fatigue-reducing position according to the present disclosure.

As illustrated in FIGS. 11 and 12, an elastic clamp 64 may be disposed between the outer surface of the rail pipe 61 and the inner surface of the slider 63. The elastic clamp 64 may have a circular tubular structure with one side thereof being open. Particularly, a friction plate 67 may be attached to the inner surface of the elastic clamp 64. The friction plate 67 is configured to be in friction contact with or detached from the outer surface of the rail pipe 61.

In addition, a pulling plate 65 that extends toward the outer diameter portion of the slider 63 may be formed integrally on one end of the elastic clamp 64. Particularly, an open area is formed in a specific position of the outer diameter portion of the slider 63. Stoppers 66 respectively having a plate shape are formed on both sides of the open area. The pulling plate 65 may be disposed between the stoppers 66 such that the pulling plate 65 may be pulled.

In addition, a first end of a manipulation cable 68 may be connected to the pulling plate 65, and a second end of the manipulation cable 68 may extend through the stoppers 66 and be connected to the user-manipulatable lever (not shown). Thus, positions of the pulling plate 65 before and after being pulled using the manipulation cable 68 may be defined by the stoppers 66. Accordingly, when the manipulation cable 68 is manipulated by being pulled, the elastic clamp 64 is expanded in the outer diameter direction while being pulled, so that the friction plate 67 of the elastic clamp 64 is detached from the outer surface of the rail pipe 61, as illustrated in FIG. 11. In other words, the friction plate 67 moves to an unlocked position, in which the friction plate 67 is neither pressing nor in friction contact with the rail pipe 61 any further.

As described above, when the unlocking position in which the friction plate 67 is neither pressing nor in friction contact with the rail pipe 61 any further, the slider 63 moves to a height-adjustable position in which the slider 63 is movable vertically along the rail pipe 61. In contrast, when the pulling manipulation of the manipulation cable 68 is released, as illustrated in FIG. 12, the pulling plate 65 may be moved to the original position by elastic restorative force of the elastic clamp 64 and, at the same time, the elastic clamp 64 is contracted in the inner diameter direction, and thus, the friction plate 67 of the elastic clamp 64 may be pressed against and in friction contact with the outer surface of the rail pipe 61. In other words, the elastic clamp 64 may be locked to the rail pipe 61.

When the rail pipe 61 is locked due to the pressing against and the friction contact with the friction plate 67, the slider 63 remains in a fixed position instead of moving up or down along the rail pipe 61. A typical reclining device 40 may be disposed on the lower portion of the rear seatback 30, i.e. at a lower position on the rear seatback 30 that is a boundary to the rear seat cushion 20. Since the reclining device 40 is implemented using a known mechanism for adjusting the reclining angle of the rear seatback 30, a detailed description thereof will be omitted.

Hereinafter, an operation flow of the device for providing a fatigue-reducing position according to the present disclosure having the above-described configuration will be described. In the device for providing a fatigue-reducing position according to the present disclosure, the first striker 11 of the front seatback 10 may be fastened to the first latch unit 100 of the rear seat cushion 20 and the second striker 62 of the sliding-locking unit 60 mounted on the package panel 50 may be fastened to the second latch unit 200 of the rear seatback 30, such that a rear seat may be placed and fixed between the front seatback 10 and the package panel 50.

First, the rear seat may be detached from a floor panel, to which the rear seat has been fitted. Afterwards, the first striker 11 mounted on the top end of the rear surface of the front seatback 10 may be inserted into the first locking recess of the second locking lever 120 of the first latch unit 100 mounted on the front end of the rear seat cushion 20. In this regard, when the user manipulates and pushes the control lever 101 upward, as illustrated in FIG. 4B, the protrusion 102 and the vertical bent bar 103 are rotated downward and, at the same time, the vertical bent bar 103 pushes the push bar 104 forward.

Subsequently, the push bar 104 pulls the first pulling end 112 of the first locking lever 110 in the forward direction and, at the same time, the first locking lever 110 rotates in the forward direction about the first rotary shaft 111. Consequently, the catching end 122 of the second locking lever 120 may be unlocked from the locking end 113 of the first locking lever 110. At the same time, the second locking lever 120 is rotated downward about the second rotary shaft 121 by elastic restorative force of the first return spring 106. Consequently, the first locking recess of the second locking lever 120 may be arranged in a forwardly-open position such that the first striker 11 is inserted thereinto.

Then, as illustrated in FIG. 4B, the first striker 11 mounted on the front seatback may be inserted, more easily, into the first locking recess of the second locking lever 120. As illustrated in FIG. 4C, after the first striker 11 is inserted into the first locking recess of the second locking lever 120, when the user releases the control lever 101, the first locking recess of the second locking lever 120 may be arranged in an upwardly-inclined position. Consequently, the first striker 11 may be in a locked position in which the first striker 11 is not separated from the first locking recess.

Figure 9:
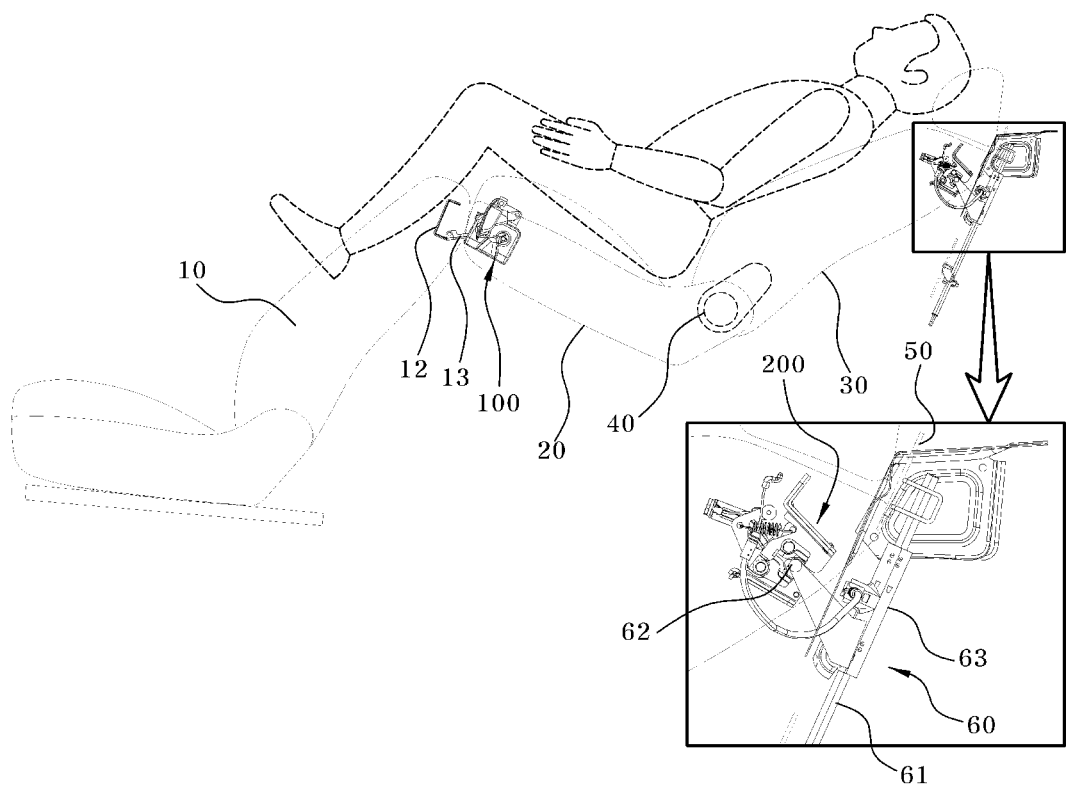
FIGS. 9 and 10 are side views illustrating the rear seat arranged in a fatigue-reducing position by the device for providing a fatigue-reducing position according to the present disclosure.

Accordingly, as illustrated in FIG. 9, the front end of the rear seat cushion 20 may be connected to the top end of the rear surface of the front seatback 10. Afterwards, the second striker 62 may be inserted into the second locking recess 242 of the second latch unit 200 mounted on the top end of the rear surface of the rear seatback 30. In this regard, when the user pulls the lever (not shown) connected to the pulling cable 231, the pulling cable 231 pulls the cable connecting end 232 of the third locking lever 230, and thus, the third locking lever 230 may rotate in the forward direction about the third rotary shaft 234.

At the same time, since the third locking lever 230 is connected to the first pulling end 241 of the fourth locking lever 240 via the second return spring 220, when the third locking lever 230 is rotated, the second return spring 220 is pulled forward to pull the first pulling end 241 of the fourth locking lever 240 forward. Then, as illustrated in FIG. 8B, since the fourth locking lever 240 is rotated in the forward direction, the second locking recess 242 may be arranged in a backwardly-open position, so that the second striker 62 may be inserted thereinto.

Subsequently, when the user releases the lever (not shown) connected to the pulling cable 231 after having inserted the second striker 62 into the second locking recess 242 of the second latch unit 200, the fourth locking lever 240 may be rotated to the original position by elastic restorative force of the second return spring 220 and thus, the second locking recess 242 may be arranged in a downwardly-open position. Consequently, the second striker 62 may be locked into the second locking recess 242.

As illustrated in FIG. 9, the top end of the rear seatback 30 may be connected to the top end of the package panel 50. In particular, as illustrated in FIG. 11, as the friction plate 67 of the elastic clamp 64 remains in pressing (e.g., in a pressing state), while being in friction contact with, the rail pipe 61, the slider 63 remains fixed instead of moving up or down along the rail pipe 61. As illustrated in FIG. 9, the second striker 62 mounted on the placing plate 69 extending from the slider 63 remains in position without moving.

As described above, as the front end of the rear seat cushion 20 is connected to the top end of the rear surface of the front seatback 10 and the top end of the rear seatback 30 is connected to the top end of the package panel 50, the rear seat cushion 20 and the rear seatback 30 are arranged in the fatigue-reducing position like a hammock such that an occupant may comfortably lie thereon.

The fatigue-reducing position may be changed as intended by the user by adjusting the forward and backward movement of the front seat, the tilting angle of the rear seat cushion, the reclining angle of the rear seatback, and the like, as well as by the upward or downward (e.g., vertically) movement of the sliding-locking unit. For example, when the fatigue-reducing position illustrated in FIG. 9 is changed to the fatigue-reducing position, i.e. when the front seat is moved forward and the rear seatback 30 is further inclined in response to the reclining device 40 being manipulated, as illustrated in FIG. 10, the height of the sliding-locking unit 60 is adjusted.

In this regard, when the user pulls the manipulation cable 68 by manipulating the lever, the pulling plate 65 connected to the manipulation cable 68 is pulled and, at the same time, the elastic clamp 64 is spread and expanded in the outer diameter direction, the friction plate 67 of the elastic clamp 64 is detached, i.e. unlocked, from the outer surface of the rail pipe 61, as illustrated in FIG. 11. Thus, when the friction plate 67 stops pressing against or being in friction contact with the rail pipe 61, i.e. the locking may be removed, the slider 63 may move vertically along the rail pipe 61. In other words, the slider 63 is in a height-adjustable position.

Figure 10:
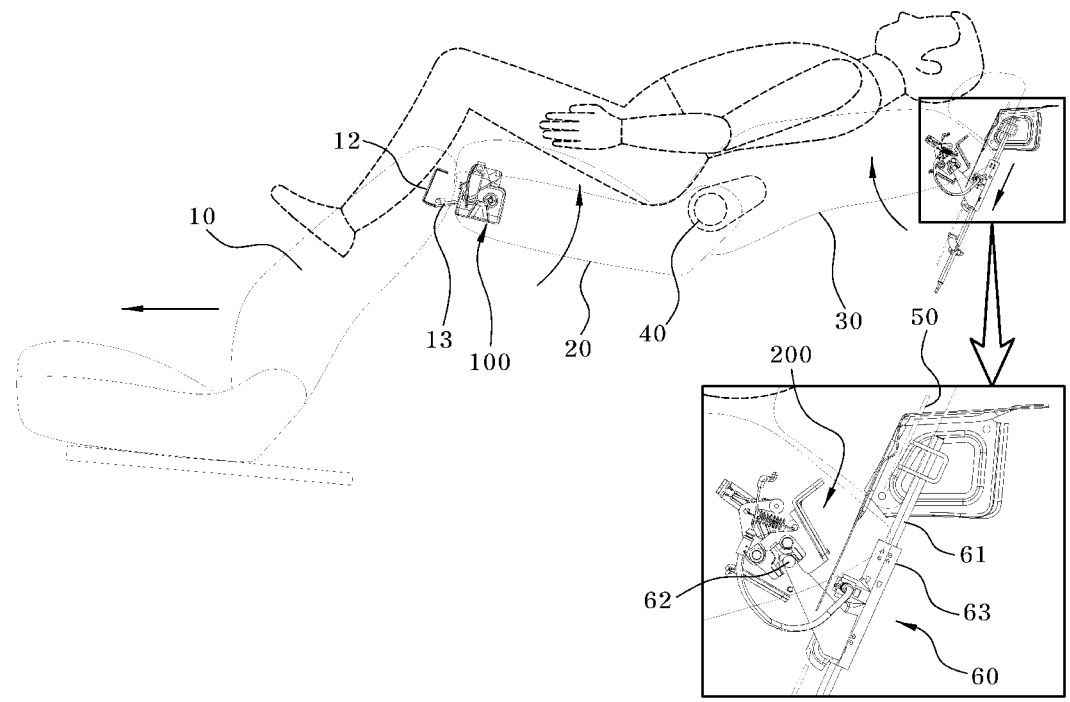

Accordingly, since the slider 63 is locked as described above after the slider 63 is moved downward from the position illustrated in FIG. 9 to the position illustrated in FIG. 10, a change to the fatigue-reducing position in which the front seat is moved forward and the rear seatback 30 is more inclined backward by the manipulation of the reclining device 40 may be performed more easily.

As set forth above, a seat in a second or third row in the cabin of a vehicle may be detached from the originally-mounted position and be fixedly placed like a hammock between a front seat and the package panel. The tilting angle of the seat cushion of the detached rear seat and the reclining angle of the seatback of the detached rear seat may be adjusted by moving the sliding-locking unit up and down. A variety of fatigue-reducing positions may be provided as intended by the occupant.

What is claimed is:

1. A device for providing a fatigue-reducing position of a vehicle seat, comprising:
   a first striker mounted on a front seatback;
   a first latch unit mounted on a rear seat cushion fastening the first striker thereto in a lockable manner;
   a second latch unit mounted on a rear surface portion of a rear seatback;
   a sliding-locking unit mounted, in a height adjustable manner on a package panel disposed behind a rear seat; and
   a second striker provided on a front end of the sliding-locking unit to be fastened to the second latch unit in a lockable manner.

2. The device of claim 1, wherein the first latch unit is mounted on a front end of the rear seat cushion or at a lower position on the front end of the rear seat cushion fastening the first striker in a lockable manner.

3. The device of claim 1, wherein the second latch unit is mounted on a top end side of the rear surface portion of the rear seatback.

4. The device of claim 1, wherein the first striker is mounted on at a top position of the front seatback which may be exposed by removing the headrest or an upper position of the rear side of the front seatback.

5. The device of claim 1, wherein the first striker of the front seatback is fastened to the first latch unit of the rear seat cushion and the second striker of the sliding-locking unit mounted on the package panel is fastened to the second latch unit of the rear seatback, to dispose and fix a rear seat between the front seatback and the package panel.

6. The device of claim 1, wherein the first striker has a shape of a quadrangular loop and is integrated with a pivot bracket, the pivot bracket being hinged or fastened to a fixing bracket fixedly mounted on a top end of a rear surface portion of the front seatback to be pivotable in a vertical direction.

7. The device of claim 1, wherein the first latch unit includes:
   a control lever mounted on a front end of the rear seat cushion to pivot when manipulated by being pulled;
   a protrusion protruding from an inner surface portion of the control lever to pivot along with the control lever when the control lever is pivoted;
   a pair of first support brackets mounted at inner positions on the front end of the rear seat cushion;
   a first locking lever including a first pulling end integrally provided on an upper portion thereof and a locking end integrally provided on a rear portion thereof, the first locking lever being axially disposed on the pair of first support brackets via a first rotary shaft;
   a push bar connected to the first pulling end of the first locking lever;
   a second locking lever including a catching end integrally provided on an upper portion thereof, the catching end restrained by the locking end of the first locking lever, and a first locking recess provided on a lower portion thereof, the first locking recess being configured to receive the first striker inserted thereinto, wherein the second locking lever is axially disposed on the pair of first support brackets via a second rotary shaft;
   a vertical bent bar connected to the protrusion and the push bar, wherein the vertical bent bar is rotated and pushes the push bar forward when the control lever and the protrusion rotate; and
   a first return spring connected to the first rotary shaft and the second rotary shaft.

8. The device of claim 7, wherein a support plate supporting the vertical bent bar is provided at a side position behind the control lever, the support plate having a slot by which an angle of rotation and a distance of the vertical bent bar are defined.

9. The device of claim 1, wherein the second latch unit includes:
   a pair of second support brackets mounted on a top end of a rear surface of the rear seatback;
   a third locking lever including a cable connecting end provided on a top portion thereof, connected to a pulling cable, and configured to be pulled, and a stopper end provided on a lower portion thereon, wherein the third locking lever is axially mounted on the pair of second support brackets via a third rotary shaft;
   a fourth locking lever including a second pulling end integrally provided on an upper portion thereof and a second locking recess provided on a lower portion thereof and receiving the second striker inserted thereinto, wherein the fourth locking lever is axially mounted on the pair of second support brackets via a fourth rotary shaft; and
   a second return spring connected to the third locking lever and the second pulling end of the fourth locking lever.

10. The device of claim 1, wherein the sliding-locking unit includes:
    a rail pipe mounted on the package panel to be arranged in a top-bottom direction;
    a slider fitted around an outer surface of the rail pipe to be movable vertically;
    an elastic clamp having a circular tubular structure with one side thereof being open, the elastic clamp being located between an outer surface of the rail pipe and an inner surface of the slider;
    a pulling plate integrally provided on one end of the elastic clamp and extending toward an outer diameter portion of the slider;
    a stopper integrally provided on an outer surface of the slider to define positions of the pulling plate before and after being pulled; and
    a manipulation cable connected to the pulling plate and configured to be pulled.

11. The device of claim 10, wherein a friction plate is provided on an inner surface of the elastic clamp to be in contact with or detached from the rail pipe.

12. The device of claim 10, wherein when the manipulation cable is manipulated by being pulled, the elastic clamp is expanded in an outer diameter direction while being pulled, for releasing the elastic clamp to neither press nor be in friction contact with the rail pipe.

13. The device of claim 10, wherein when a manipulation of pulling the manipulation cable is stopped, the pulling plate is moved to an original position while the elastic clamp is contracted in an inner diameter direction by elastic restorative force, wherein a locking operation in which the elastic clamp is pressed against and in friction contact with the rail pipe is performed.

14. The device of claim 10, wherein a placing plate protruding forward is mounted on the slider, and the second striker is provided on a front end of the placing plate.

* * * * *